(12) United States Patent
Vezzoli et al.

(10) Patent No.: US 10,860,107 B2
(45) Date of Patent: Dec. 8, 2020

(54) TOUCH-SENSITIVE INTERFACE COMPRISING A FORCE SENSOR

(71) Applicant: HAP2U, Pontcharra (FR)

(72) Inventors: Eric Vezzoli, Grenoble (FR); Cédrick Chappaz, Pontcharra (FR)

(73) Assignee: HAP2U, Pontcharra (FR)

( * ) Notice: Subject to any disclaimer, the term of this patent is extended or adjusted under 35 U.S.C. 154(b) by 0 days.

(21) Appl. No.: 16/475,659

(22) PCT Filed: Dec. 29, 2017

(86) PCT No.: PCT/FR2017/053866
§ 371 (c)(1),
(2) Date: Jul. 2, 2019

(87) PCT Pub. No.: WO2018/127651
PCT Pub. Date: Jul. 12, 2018

(65) Prior Publication Data
US 2019/0354185 A1    Nov. 21, 2019

(30) Foreign Application Priority Data

Jan. 3, 2017 (FR) ..................... 17 50047

(51) Int. Cl.
*G06F 3/041*     (2006.01)
*G06F 3/01*      (2006.01)
*G06F 3/044*     (2006.01)

(52) U.S. Cl.
CPC .............. *G06F 3/016* (2013.01); *G06F 3/044* (2013.01); *G06F 2203/04105* (2013.01)

(58) Field of Classification Search
CPC .......... G06F 3/041; G06F 3/045; G06F 3/038; G09G 5/04; G09G 3/36; G09G 5/00; G09G 5/10
See application file for complete search history.

(56) References Cited

U.S. PATENT DOCUMENTS 6,741,237 B1    5/2004  Benard et al.
8,780,053 B2    7/2014  Colgate et al.
(Continued)

FOREIGN PATENT DOCUMENTS

DE      60209730 T2    11/2006
EP      1956466 A1      8/2008
(Continued)

OTHER PUBLICATIONS

Third Party Notification for European Application No. 17832312.7, dated Jan. 29, 2020, 1 page.
(Continued)

*Primary Examiner* — Pegeman Karimi
(74) *Attorney, Agent, or Firm* — TraskBritt (57) ABSTRACT

A touch-sensitive interface has a contact surface that is able to be touched by an effector (e.g., a finger). The interface includes actuating transducers (e.g., piezoelectric transducers) allowing a standing flexural wave to be formed, in a resonant mode, extending over the length of the slab. The interface includes a detector for measuring the amplitude of the wave, and a detecting circuit for determining an attenuation signal, when the contact surface is touched by an effector. It includes a processing circuit for estimating a magnitude of the force exerted by the effector on the contact surface.

19 Claims, 5 Drawing Sheets

(56) References Cited

U.S. PATENT DOCUMENTS

| | | | | |
|---|---|---|---|---|
| 2004/0160421 | A1* | 8/2004 | Sullivan | G06F 3/043 345/173 |
| 2006/0132464 | A1 | 6/2006 | Sullivan | |
| 2009/0284485 | A1* | 11/2009 | Colgate | B60K 37/06 345/173 |
| 2010/0225596 | A1* | 9/2010 | Eldering | G06F 3/0416 345/173 |
| 2014/0327839 | A1 | 11/2014 | Giraud et al. | |
| 2015/0193087 | A1* | 7/2015 | Lin | G06F 3/0428 345/175 |
| 2017/0060279 | A1* | 3/2017 | Harrison | G06F 3/044 |

FOREIGN PATENT DOCUMENTS

| | | |
|---|---|---|
| EP | 2432126 A2 | 3/2012 |
| EP | 2707787 A1 | 3/2014 |
| EP | 2939862 A2 | 11/2015 |
| EP | 2939862 A3 | 3/2016 |
| EP | 2350795 B1 | 4/2017 |
| FR | 2927574 B1 | 8/2009 |

OTHER PUBLICATIONS

Third Party Observation for European Application No. 17832312.7, dated Jan. 31, 2020, 2 pages.
Biet et al., Squeeze Film Effect for the Design of an Ultrasonic Tactile Plate, IEEE Transactions on Ultrasonics, Ferroelectrics and Frequency Control, IEEE, vol. 54, No. 12, Dec. 2007, pp. 2678-2688.
Anonymois, Lamb Waves, Wikipedia, (page last updated Jun. 23, 2017), https://en.wikipedia.org/wiki/Lamb_waves, 8 pages.
International Search Report for International Application PCT/FR2017/053866, dated Apr. 19, 2018, 7 pages (including English translation).
International Written Opinion for International Application PCT/FR2017/053866, dated Apr. 19, 2018, 8 pages.

* cited by examiner

TOUCH-SENSITIVE INTERFACE COMPRISING A FORCE SENSOR

CROSS-REFERENCE TO RELATED APPLICATIONS

This application is a national phase entry under 35 U.S.C. § 371 of International Patent Application PCT/FR2017/053866, filed Dec. 29, 2017, designating the United States of America and published in French as International Patent Publication WO 2018/127651 A1 on Jul. 12, 2018, which claims the benefit under Article 8 of the Patent Cooperation Treaty to French Patent Application Serial No. 1750047, filed Jan. 3, 2017.

TECHNICAL FIELD

Disclosed is a touch-sensitive interface, for example, a screen, designed to be touched by an effector, for example, a finger, the touch-sensitive interface being configured for measuring a force exerted by the effector touching the plate.

BACKGROUND

The increase in the use of touchscreens, notably applied to portable devices of the tablet or mobile telephone type, is being accompanied by numerous developments. These screens generally comprise a smooth contact surface on which it is possible to control various parameters or software applications by the contact with a finger. Devices have been developed that allow a sensation of texture to be felt when a finger of a user is applied on such contact surfaces. Such a device is, for example, described in the publication by Biet M., "Squeeze film effect for the design of an ultrasonic tactile plate", IEEE Transactions on Ultrasonic, Ferroelectrics and Frequency Control, IEEE, 2007, 54 (12), pp. 2678-2688 (henceforth denoted "Biet 2007"), or else in the patent application EP1956466. In these documents, a touch-sensitive interface is described comprising a smooth plate, forming a contact surface designed to be touched by a finger. This plate is set into vibration by several piezoelectric transducers disposed in contact with the plate, underneath the latter. The transducers and the plate form a resonator conducive to the formation of a stationary flexural wave, of the Lamb wave type. When the vibration resonance frequency of the contact surface is in the ultrasound domain, for example, between 10 kHz and 100 kHz, and the amplitude of the vibration is low, typically a few microns, the user can feel a texturing of the contact surface, when their finger slides across the surface. This effect is known and is usually denoted by the term "squeeze film." The user can thus feel a sensation of roughness, or a certain resistance to sliding, while the contact surface remains smooth.

This effect has been applied to transparent contact surfaces that can form screens. This is notably the case of the U.S. Pat. No. 8,780,053, or again of the patent EP2707787. In these documents, the piezoelectric transducers are disposed near to the edges of a contact surface and allow the latter to be put into resonant vibration.

The document US2010/0225596 describes a touch-sensitive interface comprising a flexible elastomer film. The elastomer film is stretched tight and set into vibration by transducers. Under the effect of a contact with a finger of a user, the vibrational wave is modified and this modification is detected by the transducers.

Furthermore, the majority of the current touchscreens comprise sensors allowing a detection of the contact of a finger of the user by capacitive effect. For this, the contact surface comprises a transparent conducting mesh, in such a manner as to localize the area of the screen touched by the finger of a user. The performance of the contact detection is sufficient to allow a device comprising such a touchscreen to be controlled by the position of the finger or by the path of the finger across the screen, or else by dynamic parameters of movement of the finger such as a speed or an acceleration. However, although the performance of the capacitive detection is good for localizing an impact of a finger on a screen, it does not allow the force exerted by the finger to be quantified. The detection of the impact is a detection of the all or nothing type, and only determines the contact of a finger or the absence of contact.

The present disclosure aims to remedy this by providing a device allowing the force exerted by a finger, or any other type of effector, on a touch-sensitive interface to be quantified.

BRIEF SUMMARY

A first subject of the disclosure is a touch-sensitive interface, comprising a plate, defining a contact surface able to be touched by an effector, comprising:
 a transducer, referred to as actuating transducer, capable of exerting a pressure on the plate, in such a manner as to form a flexural wave, extending along the plate, according to a resonance frequency, driving a vibration of the plate;
wherein the touch-sensitive interface comprises:
 at least one detector, designed to detect an amplitude of the flexural wave, each detector being connected to a detection circuit;
 the detection circuit being configured for forming a signal, referred to as attenuation signal, representative of an attenuation of the flexural wave resulting from a contact between the effector and the contact surface;
 a processing circuit, configured for estimating a magnitude of a force applied, notably perpendicularly to the contact surface, by the effector on the contact surface, based on the attenuation signal.

The device may comprise one of the following features, taken in isolation or according to the technically feasible combinations:
 Each transducer exerts periodically modulated, in other words oscillating, pressure on the plate.
 The plate is bounded by a first lateral edge, the plate being connected to a plurality of actuating transducers aligned parallel to the first lateral edge, at least one detector being disposed in the vicinity of a second lateral edge, the second lateral edge being opposite to the first lateral edge.
 The actuating transducers ($10_n$) are configured in such a manner that:
  the amplitude of the flexural wave is less than 10 μm, or even less than 5 μm;
  and/or the resonance frequency is higher than 10 kHz;
  and/or the wavelength ($\lambda$) of the flexural wave (4) is in the range between 1 mm and 40 mm.
 The processing circuit is configured for applying a calibration function to the attenuation signal in such a manner as to estimate the magnitude of the force applied by the effector. The calibration function taken into account by the processing circuit is predetermined.
 At least one actuating transducer is a piezoelectric transducer or an electromechanical transducer of the MEMS type.

At least one detector is a piezoelectric transducer or an electromechanical transducer.

At least one detector is disposed in contact with the plate.

The plate is transparent, or comprises a transparent part.

The touch-sensitive interface is designed to generate a signal, referred to as control signal, for controlling a device, for example, a machine or a microprocessor, the control signal depending on the estimated magnitude of the force.

According to one embodiment, the detection circuit is configured for:
- measuring an amplitude of the flexural wave according to a given measurement frequency;
- comparing the measured amplitude with a reference amplitude in such a manner as to form the attenuation signal. The reference amplitude is determined in a prior step.

According to one embodiment:
- each actuating transducer is supplied by a power supply signal;
- the detection circuit is configured for establishing a power supply signal referred to as feedback signal when the amplitude of the flexural wave, detected by the detector, differs from a setpoint value;
- the detection circuit is configured for forming the attenuation signal as a function of the feedback signal.

A second subject of the disclosure is a method for estimating a magnitude of a force exerted by an effector pressing on a surface, referred to as contact surface, of a plate belonging to a touch-sensitive interface, the method comprising the following steps:
- a) formation, by at least one actuating transducer, of a flexural wave, the flexural wave extending along the plate, according to a resonance frequency;
- b) measurement, by a detector, of an amplitude of the flexural wave at a given time, referred to as measurement time;
- c) as a function of the measurement obtained during the step b), obtaining an attenuation signal, representative of an attenuation of the flexural wave under the effect of the force;
- d) estimation of the magnitude of the force, at the measurement time, as a function of the attenuation signal obtained during the step c).

The plate may be disposed in a touch-sensitive interface.

The flexural wave formed during the step a) is preferably a stationary wave. Preferably, the flexural wave formed during the step a) comprises at least one of the following characteristics:
- its amplitude is less than 10 μm, or even less than 5 μm;
- the resonance frequency is higher than 10 kHz, while being advantageously lower than 200 kHz;
- its wavelength is in the range between 1 mm and 40 mm.

The flexural wave formed during the step a) may be generated by a plurality of actuating transducers, running parallel to one edge of the plate. The transducers can deform in a periodic manner, in contact with the plate, in such a manner as to cause the formation of the flexural wave.

According to one embodiment, the step c) comprises the following sub-steps:
- ci) taking into account an amplitude referred to as reference amplitude, representative of an amplitude of the flexural wave in the absence of an effector pressing on the contact surface;
- cii) using the amplitude measured, at the measurement time, during the step b), determination of a comparison signal, representing a comparison between the reference amplitude and the measurement amplitude;
- ciii) obtaining the attenuation signal as a function of the comparison signal.

According to one embodiment:
- during the step a), each actuating transducer is supplied by a power supply signal, in the form of a power supply voltage;
- the step b) comprises a formation of a power supply signal, referred to as feedback signal, as a function of the amplitude measured at the measurement time, when the measured amplitude differs from a setpoint value;
- the step c) comprises a formation of the attenuation signal as a function of the feedback signal.

The step d) may comprise the following sub-steps:
- di) taking into account a calibration function;
- dii) application of the calibration function to the attenuation signal determined during the step c).

In the step d), the value of the estimated magnitude of the force may be assigned to a value in the range between a minimum value and a maximum value, several intermediate values being included between the minimum value and the maximum value.

The method may be implemented by means of a touch-sensitive interface according to the first subject of the disclosure.

A third subject of the disclosure is a method for controlling a device by means of an interface comprising a contact surface formed on a plate, the device being controllable by a parameter, the method comprising an application of an effector onto the contact surface in such a manner as to adjust a value of the parameter, the method comprising the following steps:
- i) application of the effector onto the contact surface, in a region of the contact surface associated with the parameter;
- ii) adjustment of the value of the parameter, as a function of an estimation of the force exerted by the effector on the contact surface, the estimation being obtained by implementing a method according to the second subject of the disclosure.

Between the step i) and the step ii), such a method may comprise a step i') for localizing a region of the contact surface touched by the effector, and for a selection of the parameter according to the region thus localized. The device may be a machine, notably a robotic machine, or a microprocessor.

A fourth subject of the disclosure is a device, capable of being controlled by a parameter, and comprising a touch-sensitive interface configured for adjusting a value of the parameter as a function of a force applied, by an effector, onto a contact surface of a wall of the touch-sensitive interface, the touch-sensitive interface corresponding to the first subject of the disclosure. The touch-sensitive interface may comprise a circuit for localizing a region of the contact surface touched by the effector, and a circuit for selecting the parameter according to the region. The circuit may be composed of a conducting circuit defining a mesh of the contact surface, and of a processing unit for determining a position of the effector with respect to the mesh, for example, by a capacitive effect.

Other advantages and features will become more clearly apparent from the description that follows of particular embodiments of the disclosure, presented by way of non-limiting examples, and shown in the figures listed hereinbelow.

DETAILED DESCRIPTION

Figure 1A:
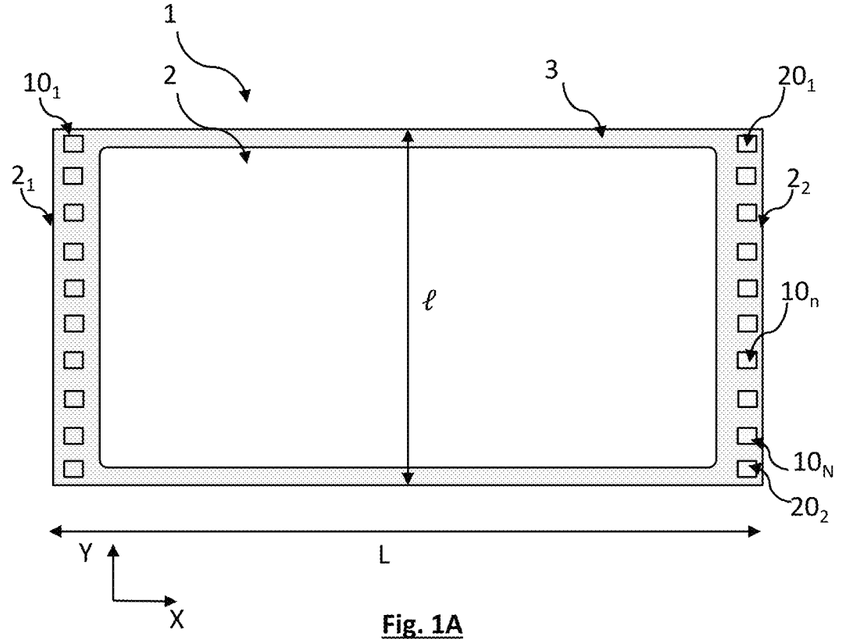
FIG. 1A shows one example of a touch-sensitive interface according to the disclosure.
Figure 1B:
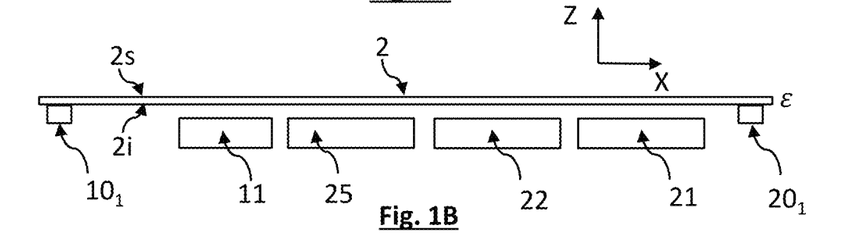
FIG. 1B is a cross-section of FIG. 1A.

FIGS. 1A and 1B show one example of a touch-sensitive interface according to the disclosure. The interface comprises a plate 2, extending in a plane XY and forming, in this plane, a rectangle of length L (along the axis X) and of width l, (along the axis Y). In this example, L=195 mm, and l=125 mm. The thickness c of the plate, along the axis Z, is 1.5 mm. The term "plate" denotes a rigid element that is thin with respect to its width or its length. The width and the length are not critical parameters, and may be in the range between a few cm, for example, 3 cm, to 30 cm or more. The touch-sensitive interface 1 is designed to control a device, for example, a robotic machine or a microprocessor allowing the execution of a software program. Thus, the touch-sensitive interface is able to supply a control signal to the device.

The thickness c must allow a vibration of the plate 2 according to a stationary flexural wave 4, as described hereinafter. The thickness c depends on the material forming the plate and on the application targeted, but it is preferably less than 10 mm, of even less than 5 mm. The material forming the plate is, in this example, glass. Other materials may be suitable, in particular, materials whose Young's modulus is in the range between 30 GPa and 100 GPa, and preferably between 30 GPa and 80 GPa. The material of the plate may, for example, be a polycarbonate, PMMA (polymethylmethacrylate), or other organic polymer, or aluminum. When the plate is intended to cover a touchscreen, it is formed from a transparent material.

In this example, the plate 2 is bounded by two lateral edges $2i$ and $2_2$ in the vicinity of which actuating transducers $10_1 \ldots 10_N$ are disposed. "In the vicinity" is understood to mean at a distance of less than 2 cm. In this example, N=18. Ten actuating transducers $10_n$ are aligned parallel to a first lateral edge $2i$, while eight actuating transducers $10_n$ are aligned parallel to a second lateral edge $2_2$, opposite to the first lateral edge $2_1$. The index n denotes a transducer, n being in the range between 1 and N. The actuating transducers $10_n$ are capable of deforming periodically, in contact with the plate 2, along an axis Z, perpendicularly to the plane XY in which the plate extends, in such a manner as to apply an oscillating pressure on the plate. The plate comprises an upper part (upper face $2s$), intended to form a contact surface, and a lower part (lower face $2i$). In this example, the actuating transducers $10_n$ are applied against the lower part (lower face $2i$ ) of the plate. Here, the transducers are piezoelectric, comprising a piezoelectric material, for example, AlN, ZnO or PZT, disposed between two electrodes. The piezoelectric actuators may be fixed against the lower part (lower face $2i$) of the plate 2 by bonding. They may also take the form of thin films, forming an integrated circuit obtained by microtechnology fabrication methods.

The plate 2 may comprise an opaque shield 3 in order to mask the actuating transducers $10_n$.

Other types of actuating transducers $10_n$ may be envisioned, for example, electromechanical devices of the MEMS type (acronym for Microelectromechanical Systems), or other transducers capable of transmitting a periodic mechanical deformation, along an axis Z perpendicular to the plane XY. These may, for example, be magnetostrictive or electrostrictive transducers.

By deforming, the actuating transducers $10_n$ induce a displacement of the plate 2 along the axis Z, in other words in a direction perpendicular to the plane XY in which it extends. The deformation of the actuating transducers $10_n$ follows oscillations. A flexural wave 4 is then generated along the length L of the plate, propagating along the longitudinal axis X. In view of the dimensions of the plate, and of the properties of the material composing it, notably the Young's modulus or the density, and also of the resonance mode, the formation of a stationary wave may be obtained, extending along the longitudinal axis X, at a resonance frequency. One example of the production of such a stationary wave is, for example, described in part III of the publication "Biet 2007" cited in relation with the above Background section, or in the U.S. Pat. No. 8,780,053. In this example, the actuating transducers $10_n$ (e.g., piezoelectric transducers) are activated in a synchronous manner, by a sinusoidal power supply signal, the latter being generated by an electrical power supply unit 11. The power supply signal applied to each actuating transducer $10_n$ has, in this example, the same electrical amplitude, with no phase difference from one transducer to another. Those skilled in the art will be capable of adapting the amplitude or the phase-shift of the power supply voltage for each actuating transducer $10_n$, in such a manner as to obtain a stationary flexural wave 4, propagating along the plate 2, according to a resonance mode. The resonance frequency of the flexural wave 4 is preferably higher than 10 kHz, and is preferably lower than 200 kHz. Such a range of frequency is situated in the ultrasound domain, not generating any acoustic interference. At the resonance frequency, a stationary flexural wave 4 is formed along the plate 2. The resonance frequency depends on the material composing the plate, on its geometrical properties and also on the characteristics of the actuating transducers $10_n$. In this example, the resonance frequency is 68 kHz. The wavelength λ of the flexural wave 4 may be in the range between 3 mm and 40 mm. In this example, the wavelength λ is 16 mm.

The amplitude of the flexural wave is preferably less than 10 μm, and is more preferably less than 5 μm or 3 μm. In this example, the flexural wave 4 is a Lamb wave with an amplitude in the range between 2 μm and 3 μm.

Each actuating transducer $10_n$ (e.g., piezoelectric transducer) extends according to a length (parallel to the axis X) and a width (parallel to the axis Y) of around 10 mm×5 mm. The spacing, along the axis Y, between two adjacent actuating transducers $10_n$ (e.g., piezoelectric transducers) is equal to 5 mm. The thickness of each actuating transducer $10_n$ (e.g., piezoelectric transducer) here is around 0.5 mm.

The actuating transducers $10_n$ (e.g., the piezoelectric transducers) may be similar to those described in the publication by E. Vezzoli, et al., "Texture rendering strategies with a high fidelity capacitive visual-haptic friction control device", International Conference on Human Haptic Sensing and Touch Enabled Computer Applications, pp. 251-260, London, 2016.

The plate 2 is also connected to two detectors 201 and 202. In this example, each detector is a piezoelectric transducer similar to the actuating transducers $10_n$ previously described, not having any driving action on the plate 2, but allowing a detection of the amplitude of vibration of the plate according to a measurement frequency, the latter being controlled by a microcontroller 25. The sampling frequency here is equal to 10 kHz. The detectors are positioned close to the oscillation maxima of the flexural wave 4.

Figure 5:
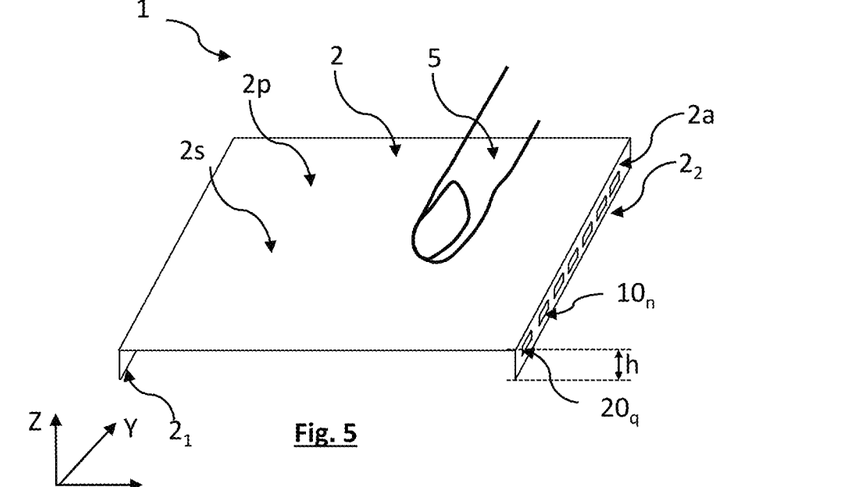
FIG. 5 shows another example of a touch-sensitive interface according to the disclosure.

Other arrangements, different from that shown in FIG. 1A, may be envisioned: the actuating transducers $10_n$ (e.g., piezoelectric transducers) may only run along one edge of the plate, or along three or four edges of the plate. They may also go up to the center of the plate. The number of actuating transducers $10_n$ operating as detectors $20_q$ may be in the range between one and ten, or even more. One particular arrangement is shown in FIG. 5, according to which the actuating transducers $10_n$ and the detectors $20_n$ are disposed perpendicularly to the plane XY of the plate 2.

FIG. 1B shows a cross-sectional view of the plate 2 shown in FIG. 1A. The touch-sensitive interface 1 comprises a detection circuit 21, coupled to the detectors 201, 202, together with a processing circuit 22. A microcontroller 25 provides the control of the actuating transducers $10_n$ and detectors $20_n$. The index "q" denotes any detector. The actuating transducers $10_n$ are supplied by a power supply unit 11 generating a modulated power supply signal V (voltage), notably sinusoidal, in such a manner as to allow a periodic deformation of the actuating transducers $10_n$.

Figure 1C:
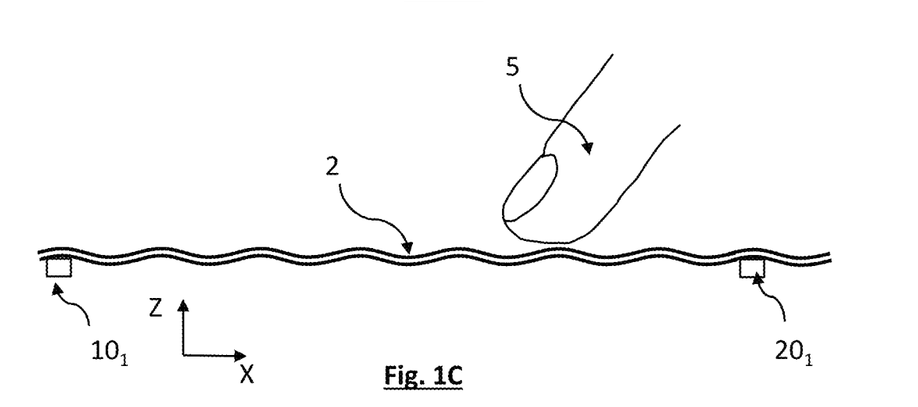
FIG. 1C shows the formation of a flexural wave on a plate, the latter being a component of the touch-sensitive interface.

Under the effect of the deformation of the actuating transducers $10_n$, at the resonance frequency, a stationary flexural wave 4 is formed, as shown in FIG. 1C. Under the effect of the flexural wave 4, the plate 2 vibrates, according to a resonance mode, the amplitude of vibration corresponding to the amplitude of the flexural wave 4. Here, "amplitude" is understood to mean an amplitude in a direction perpendicular to the plane XY in which the contact surface 2s extends.

The amplitude of vibration may be modulated by a contact of a finger 5, a rigid element, or by another effector, with the contact surface 2s. The inventors have established that, by measuring the attenuation resulting from such a contact, it is possible to not only detect the contact of the finger 5, but also to quantify a force applied by the finger 5 on the plate 2, perpendicularly to the latter. The effector may be a finger (e.g., the finger 5) or a stylus. By measuring the attenuation of the amplitude of vibration, a quantitative measurement of the force exerted by the finger 5 may be obtained. The approach followed differs significantly from the documents cited in the above Background section, according to which a vibrational wave is used to obtain a sensation, by a finger (e.g., the finger 5), of a texture on the plate 2: according to such an approach, the finger 5 acts as a detector of an effect induced by the vibration of the plate 2. According to the present disclosure, it is the vibration of the plate 2 and, more precisely, the attenuation of the amplitude of vibration, which allows the detection of the contact of the finger 5, together with a quantification of the force that it exerts on the plate 2, perpendicularly to the plane XY in which the plate 2 extends.

Each detector $20_q$, connected to the detection circuit 21, is designed to form a signal $S_{att}$, referred to as attenuation signal, representing an attenuation of the flexural wave 4 under the effect of the finger 5. The attenuation becomes higher the greater the force exerted by the finger 5 pressing on the plate 2. Thus, a measurement of the attenuation allows the magnitude of the force applied by the finger 5 pressing on the plate 2 to be estimated. The detectors $20_q$ are activated according to a high measurement frequency, for example, 1 kHz. The detection circuit 21, coupled to the detectors $20_q$, allows an attenuation signal $S_{att}$ to be obtained, at each measurement time t, according to the measurement frequency. How the attenuation signal $S_{att}$ is obtained will be described hereinafter.

The processing circuit 22 takes into account the attenuation signal $S_{att}$ supplied by the detection circuit 21, at each measurement time and, using the latter, estimates the magnitude of the force applied by the finger 5. Such an estimation may notably be based on a calibration, during which the force exerted by a finger (e.g., the finger 5), together with the attenuation signal $S_{att}$, are simultaneously measured. The calibration allows a calibration function $f$ to be established linking the magnitude F of the applied force to the attenuation signal $S_{att}$, in such a manner that $F=f(S_{att})$ (1). Such a calibration is described hereinafter, with reference to FIGS. 3A and 3B.

Figure 2A:
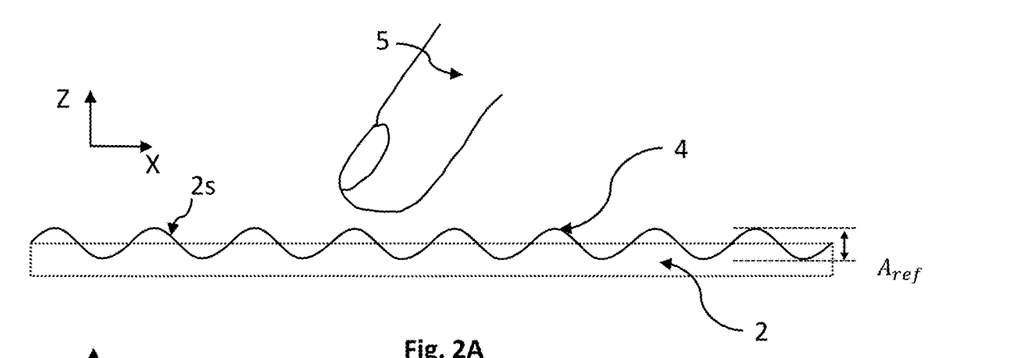
FIGS. 2A, 2B and 2C illustrate a first example of a signal being obtained that represents an attenuation of a vibration of a plate by the contact of a finger.
Figure 2B:
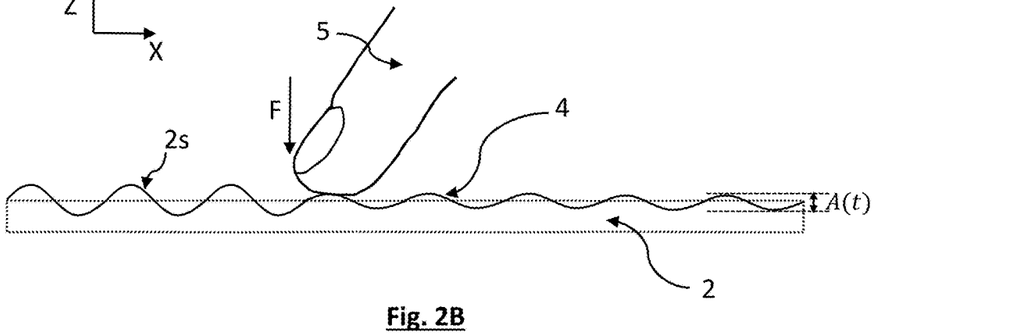
Figure 2C:
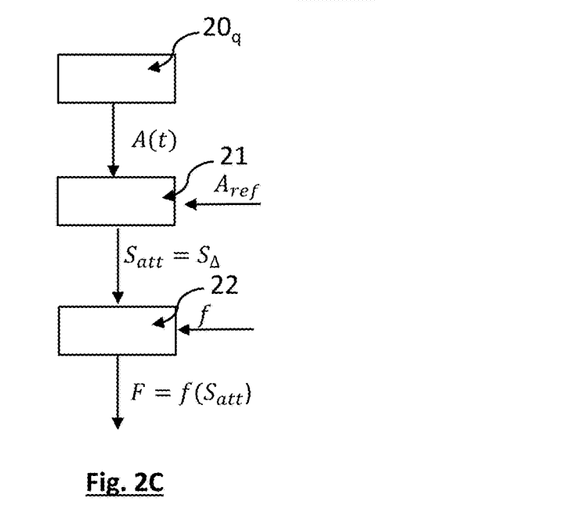

FIGS. 2A, 2B and 2C illustrate a first example of formation of an attenuation signal $S_{att}$. FIG. 2A shows the plate 2 vibrating according to a resonant mode, without being subject to the contact of a finger (e.g., the finger 5). The amplitude of the wave 4 corresponds to a reference amplitude $A_{ref}$. When a finger (e.g., the finger 5) is applied onto the plate 2, it generates an attenuation of the amplitude of vibration, according to the same resonance mode, which results in a decrease of the amplitude measured by a detector $20_q$, as shown in FIG. 2B. Each detector $20_q$ supplies a measurement of the amplitude of vibration A(t), according to the given frequency of measurement by the microcontroller 25. Following each measurement of the amplitude A(t), the detection circuit 21 establishes a signal referred to as comparison signal $S_A(t)$ representative of a comparison between the measured amplitude A(t) and the reference amplitude $A_{ref}$. A comparison is understood to mean a difference or a ratio. The reference amplitude $A_{ref}$ may be determined during an initialization, for example, during the fabrication of the touch-sensitive interface 1, or during an initialization period, for example, in the first moments of operation of the touch-sensitive interface 1. The comparison signal may be proportional to a difference between the reference amplitude and the measured amplitude, in such a manner that $S_A \propto (A_{ref}-A(t))$, the symbol $\propto$ denoting a relationship of proportionality. The comparison signal $S_A$ represents the attenuation produced by the finger 5. It thus forms the attenuation signal: $S_{att} S_A$. The processing circuit 22 subsequently estimates the magnitude of the applied force, based on the attenuation signal $S_{att}$, using the calibration function $f$, according to the expression (1).

Figure 2D:
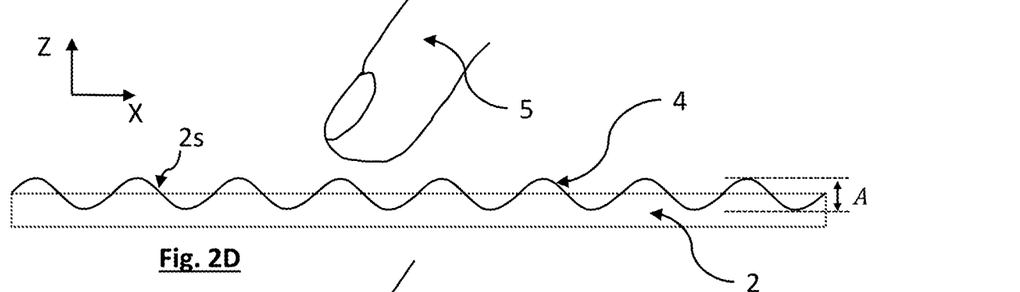
FIGS. 2D, 2E and 2F illustrate a second example of a signal being obtained that represents an attenuation of a vibration of a plate by the contact of a finger.
Figure 2E:
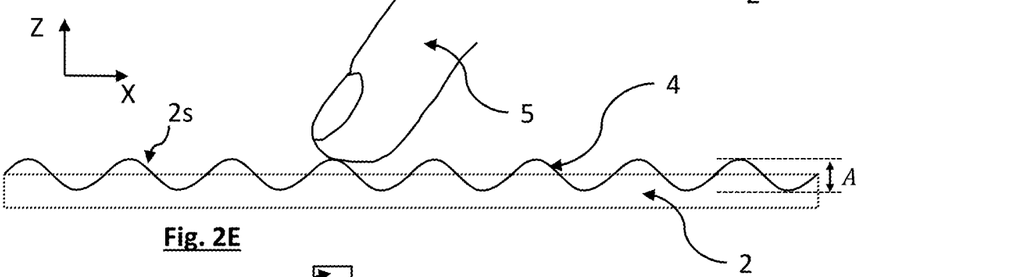
Figure 2F:
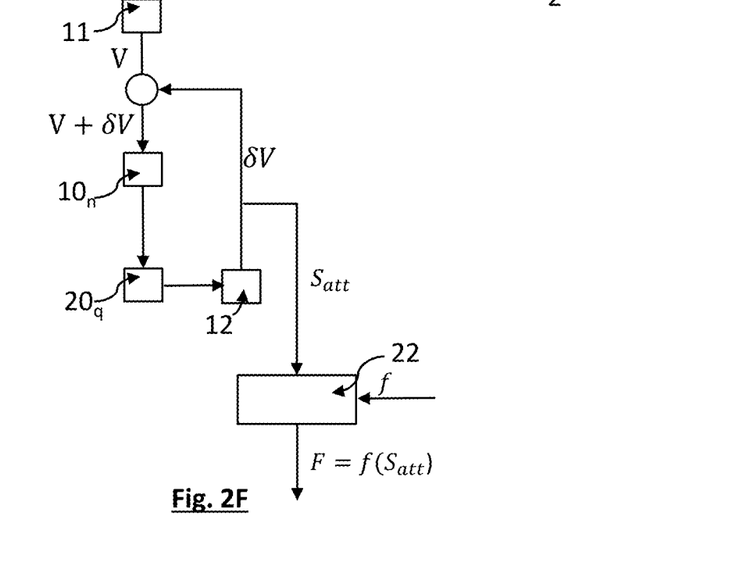

Another example of formation of an attenuation signal $S_{att}$ is shown in FIGS. 2D, 2E and 2F. According to this example, the detection circuit 21 operates according to a mode referred to as closed-circuit mode, comprising a feedback loop. FIGS. 2D and 2E show a vibration of the plate respectively in the absence of contact and in the presence of a finger (e.g., the finger 5) pressing on the contact surface 2s of the plate 2. When the finger 5 is pressed, the feedback loop acts on the power supply signal of the actuating transducers $10_n$, in such a manner as to maintain a substantially constant amplitude of vibration A, in other words constant to within 5% or 10%, corresponding to a setpoint amplitude. FIG. 2F shows schematically this operation. When one or more detectors $20_q$ detect a decrease in the amplitude, a correction block 12 addresses a power supply signal δV, referred to as feedback signal, which is added to the power supply voltage V of the actuating transducers $10_n$, in such a manner as to modulate the supply power of the latter. The amplitude of the flexural wave A is thus substantially constant and corresponds to the setpoint amplitude. The feedback signal δV is representative of the attenuation produced by the finger 5. This may be a voltage that is added to the power supply voltage V. Thus, according to this example, the attenuation signal depends on the feedback signal δV. For example, $S_{att} \propto \delta V$. The processing circuit 22 subsequently estimates the magnitude of the applied force, as a function of the attenuation signal $S_{att}$, using the calibration function $f$, according to the expression (1).

Figures 3A, 3B:
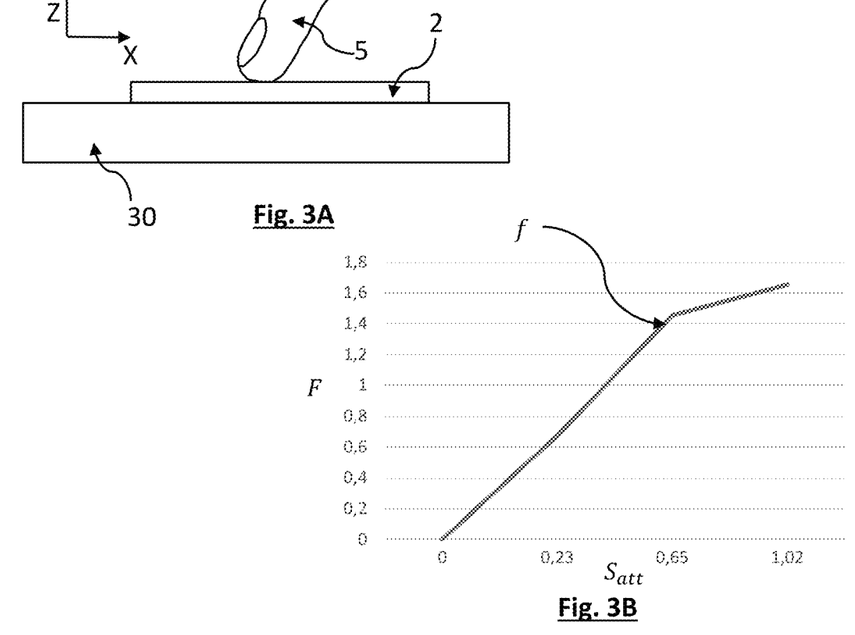
FIGS. 3A and 3B show one example of determination of a calibration function.

One exemplary calibration is now described, which allows the calibration function $f$ to be obtained, with reference to FIGS. 3A and 3B. During the calibration, the plate 2 is connected to a force sensor 30, for example, a scale or a dynamometer. A finger (e.g., the finger 5) is applied to the plate 2 with an applied force of variable magnitude. The magnitude F of the force is measured by the force sensor 30, and the attenuation signal $S_{att}$ corresponding to each measured magnitude of force is also measured. A calibration function $f$ is obtained, such a function being shown in FIG. 3B.

The calibration may depend on the effectors. If various effectors are used, for example, a finger (e.g., the finger 5) or a stylus, it is preferable to establish a calibration for each type of effector.

Figure 4A:
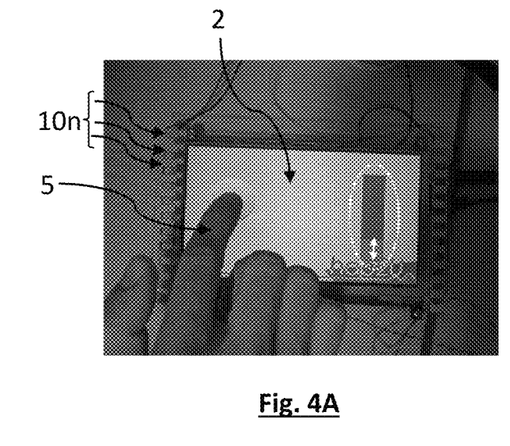
FIGS. 4A and 4B are examples of implementation of an interface, allowing an estimation of a force applied by a finger on the interface.
Figure 4B:
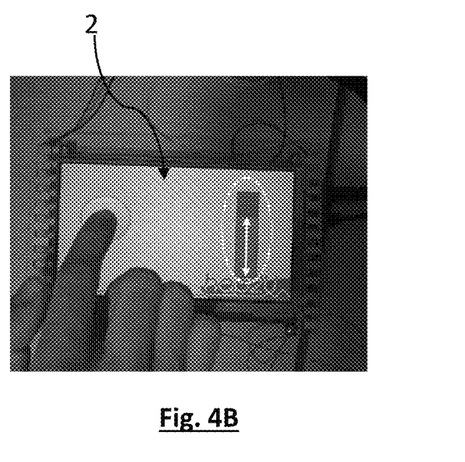

FIGS. 4A and 4B show the results of experimental trials, carried out according to a configuration similar to that described with reference to FIGS. 1A and 1B. The plate 2 is a transparent glass screen. The device tested is a tablet comprising a software application allowing the measured level of magnitude of the force to be displayed in the form of a graph. The graph is surrounded by a white dashed contour line. On the graph, the level of magnitude appears in the form of a bar, whose length varies with the measured magnitude of the force. A white dashed contour line shows the change in the bar between FIG. 4A (low applied force) and FIG. 4B (high applied force).

The disclosure allows a precise quantification of the magnitude of the applied force F. It may allow at least five different levels of applied force, or even more, to be discriminated, where the measurement dynamic range may comprise ten, or several tens or even more, different levels between a minimum level Fmin and a maximum level Fmax. Thus, the estimated magnitude of the force is in the range between a minimum value Fmin (for example, the absence of contact) and a maximum value Fmax, where the magnitude may take at least one, but preferably at least five or ten, or even more, intermediate values in the range between the minimum value Fmin and the maximum value Fmax. The step between two consecutive intermediate values defines the precision of the measurement.

FIG. 5 shows schematically another embodiment, inspired by the configuration described in the patent EP2707787. According to this embodiment, the plate 2 comprises a plane part 2p, extending between a lower face 2i and an upper face 2s, the upper face 2s forming the contact surface 2s. The plane part 2p extends in a plane XY. Between each lateral edge 2i and 22 and the plane surface, the plate 2 comprises a part, referred to actuating part 2a, extending perpendicularly to the plane part 2p, in a plane YZ. The actuating transducers $10_n$ and the detectors $20_q$ are disposed in contact with the actuating part 2a. The actuating part 2a extends up to a height, along the axis Z, preferably of less than 2 cm. The intersection between the plane part 2p and each actuating part 2a preferably corresponds to a node of the vibrational mode of the plate 2. Such a configuration allows the area of the plane part 2p to be optimized, as described in the patent EP2707787.

The touch-sensitive interface 1 may be used for controlling various types of devices. When the plate 2 is transparent, it may form a touchscreen and allow a control of a software application or of a machine as a function of the force exerted by the finger 5. Such an interface may equip portable consumer communications devices, such as mobile telephones or tablets. It may also be used for the control of equipment, for example, industrial equipment. The touch-sensitive interface 1 allows an additional degree of freedom to be added, taking into account information regarding the magnitude of the force applied by the finger 5. It may then be combined with information for localizing the finger 5, supplied by capacitive detection. The localization of the finger 5 allows the selection of an operational parameter to be adjusted, the magnitude of the applied force then allowing an adjustment of the value of the parameter.

Figure 6:
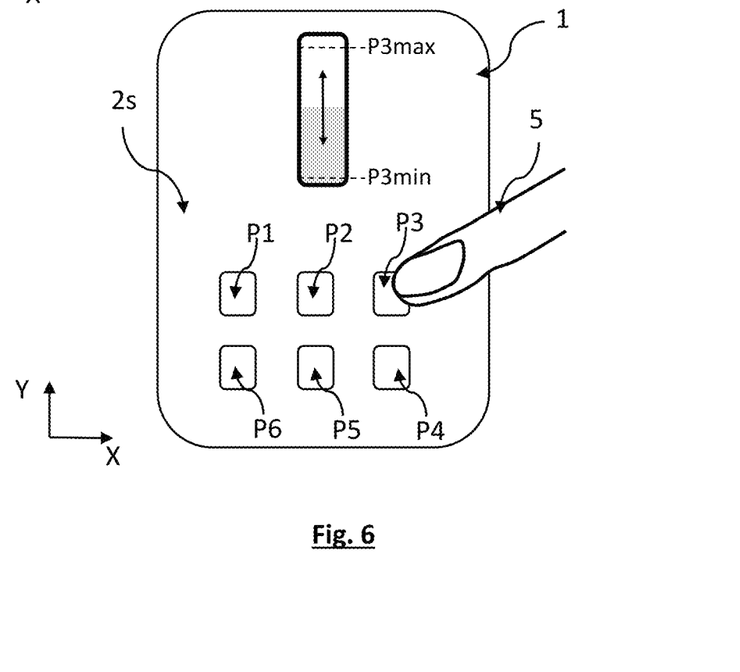
FIG. 6 shows one example of application of the touch-sensitive interface according to the disclosure.

FIG. 6 shows a touch-sensitive interface (e.g., the touch-sensitive interface 1) whose contact surface 2s forms a touchscreen. In this example, the touch-sensitive interface 1 allows the adjustment of six parameters P1, P2, P3, P4, P5 and P6. A region of the screen, taking the form of an icon, corresponds to each parameter. The touch-sensitive interface 1 comprises a circuit for localizing the position of a finger (e.g., the finger 5). The localization circuit may be based on a detection of the finger 5 by capacitive effect. When a finger (e.g., the finger 5) is applied onto the screen, the touch-sensitive interface 1 detects its position on the screen, as a function of which the parameter to be adjusted is selected. In the example shown, the parameter adjusted is the parameter P3. As a function of the force exerted by the finger 5 on the contact surface 2s, the touch-sensitive interface 1 generates a control signal allowing the adjustment of the value of the parameter P3 between a minimum value P3min and a maximum value P3max. The disclosure allows the selection of a plurality of parameters and the adjustment of each of them.

The invention claimed is:

1. A touch-sensitive interface, comprising a plate, defining a contact surface designed to be touched by an effector, the touch-sensitive interface comprising:
    an actuating transducer, designed to exert a pressure on the plate, so as to form a stationary flexural wave extending along the plate, according to a resonance frequency, driving a vibration of the plate,
    wherein the touch-sensitive interface further comprises:
        at least one detector, designed to detect an amplitude of the flexural wave, each detector being connected to a detection circuit;
        the detection circuit being configured for forming an attenuation signal, representative of an attenuation of the flexural wave resulting from a contact between the effector and the contact surface; and
        a processing circuit, configured for estimating a magnitude of a force applied, by the effector, onto the contact surface, based on the attenuation signal.

2. The touch-sensitive interface of claim 1, wherein the plate is bounded by a first lateral edge, the plate being connected to a plurality of the actuating transducer aligned parallel to the first lateral edge, the at least one detector being disposed in the vicinity of a second lateral edge, the second lateral edge being opposite to the first lateral edge.

3. The touch-sensitive interface of claim 1, wherein the actuating transducer is configured so that:
the resonance frequency is higher than 10 kHz;
the amplitude of the flexural wave, in a direction perpendicular to the contact surface, is less than 10 μm or less than 5 μm; and/or
the wavelength of the flexural wave is in the range between 1 mm and 40 mm.

4. The touch-sensitive interface of claim 1 wherein the detection circuit is configured for:
measuring an amplitude of the flexural wave according to a given measurement frequency; and
comparing the measured amplitude with a reference amplitude in such a manner as to form the attenuation signal.

5. The touch-sensitive interface of claim 1 wherein:
the actuating transducer is supplied by a power supply signal;
the detection circuit is configured for establishing a feedback signal when the amplitude of the flexural wave, detected by the detector, differs from a setpoint value; and
the detection circuit is further configured for forming the attenuation signal as a function of the feedback signal.

6. The touch-sensitive interface of claim 1, wherein the processing circuit is configured for applying a calibration function to the attenuation signal so as to estimate the magnitude of the force applied by the effector.

7. The touch-sensitive interface of claim 1 wherein:
the actuating transducer is a piezoelectric transducer or an electromechanical transducer of the MEMS type; and/or
the at least one detector is a piezoelectric transducer or an electromechanical transducer.

8. The touch-sensitive interface of claim 1, wherein the plate is transparent.

9. A device, configured to be controlled by a parameter and comprising a touch-sensitive interface configured for adjusting a value of the parameter as a function of a force applied, by an effector, onto a contact surface of a wall of the touch-sensitive interface, the touch-sensitive interface comprising the touch-sensitive interface of claim 1.

10. The device of claim 9, wherein the touch-sensitive interface also comprises a circuit designed to localize a region of the contact surface touched by the effector, and a circuit configured for selecting the parameter as a function of the region.

11. A method for estimating a magnitude of a force exerted by an effector pressing on a contact surface of a plate belonging to a touch-sensitive interface, the method comprising:
a) forming, by at least one actuating transducer, a stationary flexural wave, the flexural wave extending along the plate, according to a resonance frequency;
b) measuring, with a detector, an amplitude of the flexural wave at a measurement time;
c) as a function of the measurement obtained during b), obtaining an attenuation signal representative of an attenuation of the flexural wave under the effect of the force; and
d) estimating the magnitude of the force, at the measurement time, as a function of the attenuation signal obtained during c).

12. The method of claim 11, wherein, during a), the flexural wave is formed by a plurality of the at least one actuating transducer, running parallel to one edge of the plate.

13. The method of claim 11, wherein:
the resonance frequency is higher than 10 kHz;
the amplitude of the flexural wave, in a direction perpendicular to the contact surface, is less than 10 μm, or even less than 5 μm; and/or
the wavelength of the flexural wave is in the range between 1 mm and 40 mm.

14. The method of claim 11, in which c) comprises:
ci) taking into account a reference amplitude, representative of an amplitude of the flexural wave in the absence of an effector pressing on the contact surface;
cii) based on the amplitude measured, at the measurement time, during b), determining a comparison signal, representing a comparison between the reference amplitude and the measurement amplitude; and
ciii) obtaining the attenuation signal as a function of the comparison signal.

15. The method of claim 11, wherein:
during a), each actuating transducer is supplied by a power supply signal;
b) comprises forming a feedback signal, as a function of the amplitude, measured at each measurement time, when the measured amplitude differs from a setpoint value; and
c) comprises forming the attenuation signal as a function of the feedback signal.

16. The method of claim 11, wherein d) comprises:
di) taking into account a calibration function; and
dii) applying the calibration function to the attenuation signal determined during c).

17. The method of claim 11, wherein, during d), the value of the estimated magnitude is assigned to a value in the range between a minimum value and a maximum value, and wherein several intermediate values being included between the minimum value and the maximum value.

18. A method for controlling a device by means of a touch-sensitive interface comprising a contact surface formed on a plate, the device being controllable by a parameter, the method comprising applying an effector onto the contact surface so as to adjust a value of the parameter, the method further comprising:
i) applying the effector onto the contact surface, in a region of the contact surface associated with the parameter; and
ii) adjusting the value of the parameter, as a function of an estimation of the force exerted by the effector on the contact surface, the estimation being obtained by implementing the method according to claim 11.

19. The method of claim 18, comprising, between i) and ii):
i') localizing a region of the contact surface touched by the effector, and for selecting the parameter according to the region thus localized.

* * * * *

UNITED STATES PATENT AND TRADEMARK OFFICE
CERTIFICATE OF CORRECTION

PATENT NO. : 10,860,107 B2  
APPLICATION NO. : 16/475659  
DATED : December 8, 2020  
INVENTOR(S) : Eric Vezzoli and Cédrick Chappaz Page 1 of 1

It is certified that error appears in the above-identified patent and that said Letters Patent is hereby corrected as shown below:

In the Specification

| | | |
|---|---|---|
| Column 5, | Line 30 | change "l, (along the axis Y). In this example, L=195 mm, and l=125" to --$\ell$ (along the axis Y). In this example, L=195 mm, and $\ell$=125-- |
| Column 5, | Line 31 | change "thickness c of" to --thickness $\varepsilon$ of-- |
| Column 5, | Line 41 | change "thickness c must" to --thickness $\varepsilon$ must-- |
| Column 5, | Line 43 | change "thickness c depends" to --thickness $\varepsilon$ depends-- |
| Column 5, | Line 55 | change "2i and 22" to --$2_1$ and $2_2$-- |
| Column 5, | Line 59 | change "edge 2i, while" to --edge $2_1$, while-- |
| Column 5, | Line 60 | change "edge 22, opposite" to --edge $2_2$, opposite-- |
| Column 6, | Line 3 | change "2i ) of the" to --2i) of the-- |
| Column 7, | Line 25 | change "detectors $20_n$ are" to --detectors $20_q$ are-- |
| Column 7, | Line 32 | change "detectors $20_n$. The" to --detectors $20_q$. The-- |
| Column 8, | Line 31 | change "of the wave" to --of the flexural wave-- |
| Column 9, | Line 67 | change "2i and 22" to --$2_1$ and $2_2$-- |

In the Claims  
Claim 18, Column 12, Line 45   change "by means of" to --by way of--

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*